United States Patent

Tassier

[11] Patent Number: 5,956,114
[45] Date of Patent: Sep. 21, 1999

[54] ARTIFICIAL HORIZON SPECTACLES

[76] Inventor: Philippe Tassier, Dréve des Magnolias 3, B-1950 Kraainem, Belgium

[21] Appl. No.: 08/894,282

[22] PCT Filed: Feb. 8, 1996

[86] PCT No.: PCT/BE96/00010

§ 371 Date: Feb. 2, 1998

§ 102(e) Date: Feb. 2, 1998

[87] PCT Pub. No.: WO96/25685

PCT Pub. Date: Aug. 22, 1996

[30] Foreign Application Priority Data

Feb. 15, 1995 [BE] Belgium .................................. 9500121
Jun. 23, 1995 [BE] Belgium .................................. 9500561

[51] Int. Cl.⁶ .................................................. G02C 1/00
[52] U.S. Cl. ............................ 351/41; 351/158; 351/165
[58] Field of Search ........................... 551/160 R, 160 H, 551/159, 41, 163, 164, 165, 158

[56] References Cited

U.S. PATENT DOCUMENTS

| 2,535,321 | 12/1950 | Rooney ........................................ 88/41 |
| 4,172,662 | 10/1979 | Vogel ....................................... 356/248 |
| 4,185,903 | 1/1980 | Land .......................................... 354/59 |
| 4,477,158 | 10/1984 | Pollack et al. ............................. 351/41 |
| 4,948,244 | 8/1990 | Jones ........................................ 351/51 |
| 5,177,510 | 1/1993 | Peters et al. .............................. 351/45 |
| 5,355,182 | 10/1994 | Barbera .................................... 351/45 |

FOREIGN PATENT DOCUMENTS 0 603 092 A1 6/1994 European Pat. Off. .
WO 91/00541 A1 1/1991 WIPO .

Primary Examiner—Scott J. Sugarman
Attorney, Agent, or Firm—Alix, Yale & Ristas, LLP

[57] ABSTRACT

A spectacles frame optionally including lenses and comprising an artificial horizon which is held in a horizontal position at all times regardless of the movement of the frame or the wearer's head.

7 Claims, 3 Drawing Sheets

ARTIFICIAL HORIZON SPECTACLES

CROSS-REFERENCE TO RELATED APPLICATIONS

This is the national stage of International Application No. PCT/BE96/00010 filed Feb. 8, 1996.

SUBJECT OF THE INVENTION

The present invention relates to improvements made to spectacles so as to provide the person wearing them with an artificial "horizon".

The term "spectacles" must be understood in the widest sense, as applying both to neutral spectacles, spectacles having correcting lenses and sunglasses and to accessories having the identical function which may be mounted on spectacles, such as clip-ons.

In reality, the present invention applies more particularly to a spectacles frame with or without lenses and having an artificial horizon.

TECHNICAL FIELD

Many factors, both physiological and psychosomatic, can cause sensations of nausea of the seasickness type, this term extending, of course, to similar symptoms such as car sickness, air sickness, etc.

It is obvious that these symptoms are caused by movement, essentially rolling movement, and secondarily pitching movement, with the loss of the usual spatial references.

More particularly at sea, the unpleasant symptoms are lessened or eliminated by keeping one's gaze on the horizon line. However, as soon as the usual references are lost, and in particular when, for example, a person is inside a boat and more particularly when it is attempted to read or write for example, the table or book gives the impression of "slipping away", and the risk of seasickness increases.

In order to remedy this phenomenon and increase the wearer's comfort, the invention is intended to substitute the actual horizon line as perceived with an artificial horizon giving the impression to the wearer of a stable horizon line despite the fluctuations which he suffers due to the effect of the rolling.

It is apparent that the use of spectacles of this type gives the wearer a situation of stability which contributes to reducing the symptoms generally associated with seasickness.

SUMMARY OF THE INVENTION

Various techniques have already been proposed for allowing rotation of a lens in a spectacles frame. Thus, patent U.S. Pat. No. 4,948,244 describes a device in which the spectacle lens, which in fact consists of multiple lenses, may rotate so as to allow the type of lens used to be modified according to the wearer's wishes. This device is not intended to create an artificial horizon.

Publication EP-A-0603092 describes a display system mounted on a helmet, which is intended for pilots so as to prevent them becoming spatially disoriented and which recreates an artificial horizon in the region called the peripheral vision region. This device is not mounted on spectacles and is intended for very specific uses. Nor is it conceivable that it be worn permanently.

Document WO-A-9100541 describes spectacles provided, on the lenses, with lines which are essentially arranged either horizontally or vertically and which enable the person wearing the spectacles to line up his body, his head and his hands with the object which he wishes to look at, such as, inter alia, a golf ball.

Document U.S. Pat. No. 5,355,182 describes a pair of spectacles which are also intended to be worn by a golfer for the purpose of enabling him to line up the golf ball with the target. These spectacles are provided with lenses essentially having two differently darkened regions separated by a line which makes an angle of between 5 and 150 with the horizontal.

Document U.S. Pat. No. 2,535,321 describes adjustable spectacles having two regions separated by a fixed strip. These two regions are essentially intended for two different types of sight.

Document U.S. Pat. No. 4,172,662 describes an optical viewing device comprising a series of lenses and, among other things, a diaphragm provided with an artificial horizon. This device is intended to measure angles within a microscope.

Document U.S. Pat. No. 4,185,903 describes a device which enables a photocell on a camera to be spatially stabilized. This very complex device comprises, among other things, means to allow this spatial stabilization of the photocell.

SOLUTIONS PROPOSED BY THE INVENTION

The invention relates to spectacles in the sense mentioned above, and more particularly to a spectacles frame which may or may not be provided with lenses, characterized in that it includes an artificial horizon which consists of a line visible to the wearer and maintained in a permanent horizontal position regardless of the movements of the spectacles or of the head on which said spectacles are worn.

In order to avoid sudden movements or the simple fact of walking causing maintained oscillations of the device, it is advantageous to provide a delaying or damping means.

Various embodiments are possible according to the invention.

The principle on which all the embodiments rest is the fact that there exists a reference which is to physically define the artificial horizon line. This reference may, for example, consist of a line drawn on or incorporated in or applied to lenses, but also of a reference physically defined by two differently colored or contrastingly shaded sectors of the lens.

The reference may also consist of a region, of greater or lesser width, which is clearer for example, differentiating the two adjacent regions.

In the case in which the lenses are mounted so as to be able to rotate in the frame, a suitable device keeps said reference perpendicular to the direction of gravity.

Practical realization of this set-up is possible using various techniques and options. It may, for example, be envisaged that the lenses can rotate in a groove cut out in the frame, optionally with a peripheral mounting of the ball-bearing type.

It may also be envisaged that the glasses are supported by pistons which float on a liquid of suitable density. This liquid may be contained in a tube applied against the spectacles frame or in the latter.

The lens containing this device does not necessarily have to be that provided for the use of the spectacles, in particular the usual spectacles for correcting the wearer's sight. Various systems, generally termed clip-ons, that is to say lenses superimposed on the optical lenses, are possible.

It is also possible to provide a fixed lens and a rotating lens having the reference mounted on a common axis.

It is also possible to provide a movable strip mounted on a spindle applied to a fixed lens or a strip supported directly by the pistons. In the latter case, it may even be envisaged having no lenses in the frames.

According to another embodiment, a magnetized ball or another element, such as a roller, may slide in a tube applied against or in a frame. The lens is provided with a metal plate or with another metal element so that the movement of the ball brings about that of the lens.

According to yet another embodiment, it is also possible to include between two lenses, adhesively bonded in a sealed manner, two liquids, having a density and a color which are different, these optionally being separated by a float. It is also possible to partly include therein a single liquid on which a float optionally rests. In the absence of a float, it is preferable that the liquid be colored so as to create an artificial horizon.

According to an embodiment which is different again, it is possible to envisage providing, between two lenses adhesively bonded in a sealed manner, an element which is mounted on a spindle and which enables the artificial horizon to be symbolized. This element may be a strip, a lens having two differently colored sectors, a half-moon or any other shape enabling the same objective to be achieved. Furthermore, a liquid which acts as a damper is added within the two adhesively bonded [lens].

BRIEF DESCRIPTION OF THE DRAWINGS

In the various figures, identical reference numbers will be used for identical or similar constituent elements.

DESCRIPTION OF A NUMBER OF PREFERRED EMBODIMENTS

Figure 1:
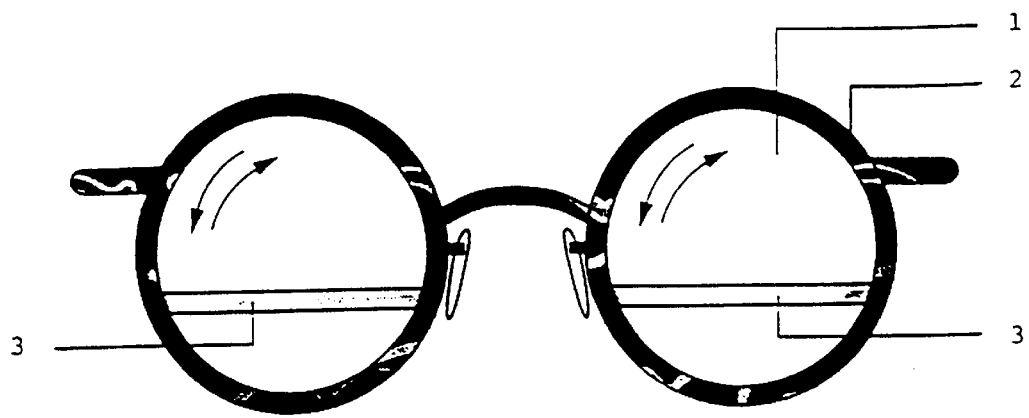
FIG. 1 diagrammatically represents a partial view of a spectacles frame having rotating lenses provided with a line which physically defines an artificial horizon.

In FIG. 1, a lens 1 is mounted in the frame 2. A line 3 intended to physically define an artificial horizon for the person wearing these spectacles is drawn, incorporated or applied on this lens or in this lens. Because of the fact that the lens is mounted so as to be able to rotate in the frame and that it is suitably weighted at its lower part, it will physically define a constant horizon line for the wearer regardless of the movements to which he is subjected.

Optionally, it would be conceivable for the lenses to be completely absent. In this case, only the frame 2 is provided with a movable element enabling an artificial horizon 3 to be created.

Figure 2:
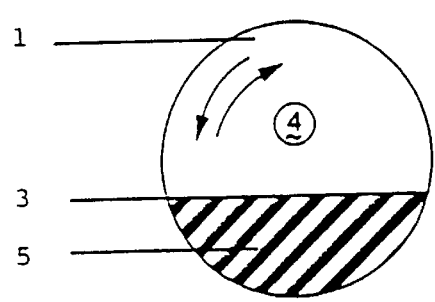
FIGS. 2 and 3 diagrammatically represent lenses in which the artificial horizon line is physically is defined respectively by contrasts of two colors or shades and by a region which differentiates two adjacent regions by means of a contrast in colors or in shades.

In FIG. 2, the horizon line is physically defined by the contrast between a first sector 4 and a second sector 5, these having different shades or colors.

Figure 3:
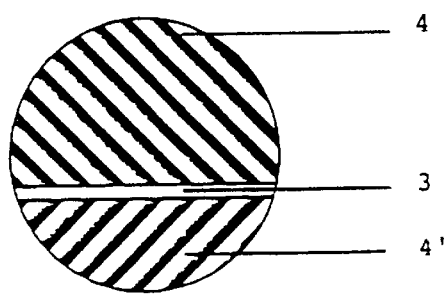

In FIG. 3, the horizon line is physically defined by a region 3 lying between two regions 4 and 4' whose color or shade is contrasted with respect to the first region 3.

Figure 4:
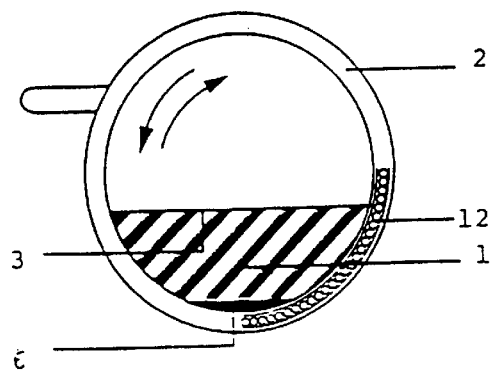
FIG. 4 diagrammatically represents a device having rotating lenses mounted on bearings.

FIG. 4 shows an arrangement having a circular frame 2 which accommodates a lens 1 which can move and is able to rotate under the effect of a peripheral bearing 12. The weighting has been symbolized by the reference number 6. In this embodiment, the rotating lens can move in a groove cut out in the frame.

Figure 5:
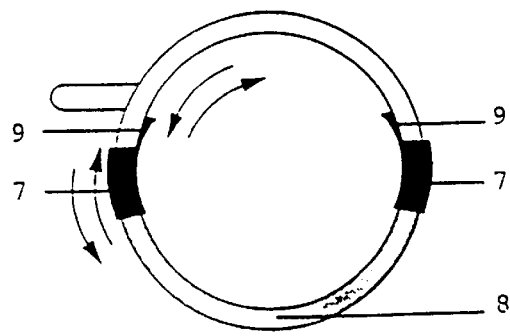
FIG. 5 diagrammatically represents a device having rotating lenses mounted on pistons.

FIG. 5 shows a device having pistons floating on a liquid of suitable density. The reference numbers 7 indicate two pistons floating in a tube 8 containing a liquid of suitable density. The fixing rods 9 enable the piston to be fixed to the lens. The tube 8 containing the liquid is applied against a spectacles frame or in the latter.

Figure 6:
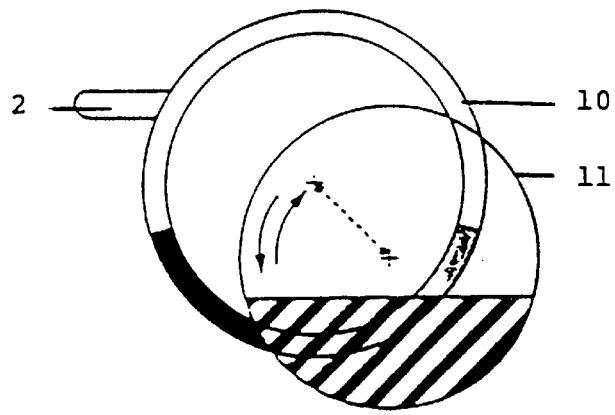
FIG. 6 diagrammatically represents a superimposition of a rotating lens having an artificial horizon on a fixed lens.

FIG. 6 shows a fixed lens 10, such as a correcting lens, mounted conventionally in a frame 2. Superimposed on it is a rotating lens 11 which can move on a spindle and which keeps the rotating lens in front of the fixed lens.

Figure 7:
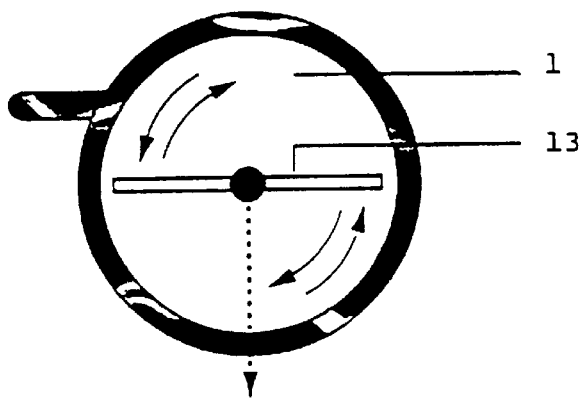
FIG. 7 diagrammatically represents a design having moving strips.

In FIG. 7, a movable strip 13 has been mounted on a lens by means of a spindle. Suitable means must, of course, be provided so that a weighting effect is caused, which keeps the strip 13 perpendicular to direction of gravity.

Figure 8:
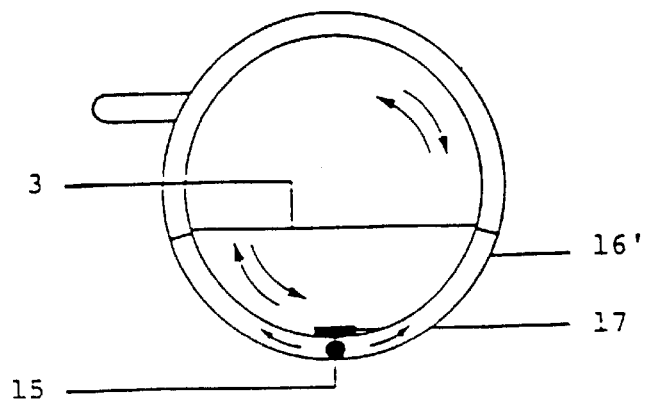
FIG. 8 diagrammatically represents a design of rotating lenses having magnetic attraction.

In FIG. 8, a magnetized ball or roller 15 has been used, which slides in a tube 16' applied to or mounted in a frame. The lens is provided with a metal plate 17 or another metal element so that the movement of the ball brings about the movement of the lens. In this design, the ball 15 runs freely in the tube and is subject to the effect of gravity. Because of its magnetization characteristics, the effect of the ball is therefore always to attract the metal part toward the lowest point, thus providing a constant artificial horizon. Of course, the functions could be reversed, that is to say use could be made of a magnetized metal part 17 so that this magnetized metal part is attracted simply by the metallic nature of the ball 15.

Figure 9:
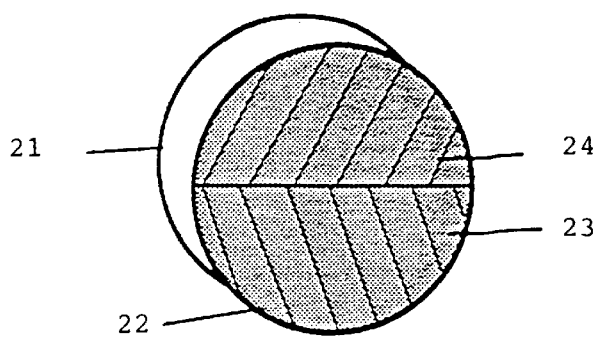
FIGS. 9 to 12 represent several embodiments in the case in which it is chosen to take two lenses adhesively bonded to each other in a sealed manner and comprising, within them, a liquid.

FIG. 9 shows an embodiment in which two lenses 21 and 22 have been chosen which are adhesively bonded in a sealed manner and which contain at least one liquid 23 in the gap between them. Preferably, two liquids 23 and 24 of different color and density are provided.

Figure 10:
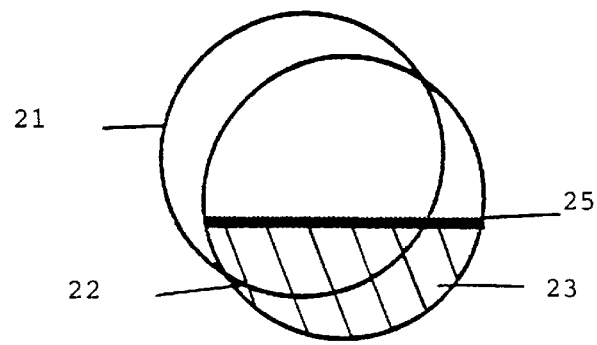

According to another embodiment as depicted more specifically in FIG. 10, it is possible to envisage placing a float 25 either on the liquid 23 or between the two liquids 23 and 24 (not shown).

Figure 11:
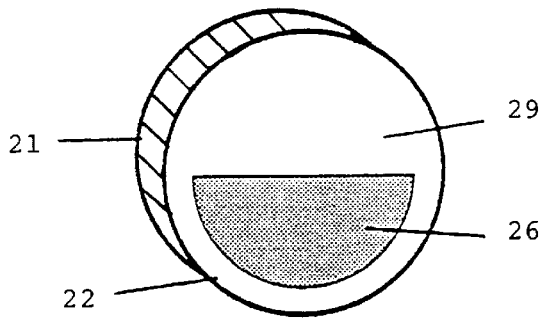
Figure 12:
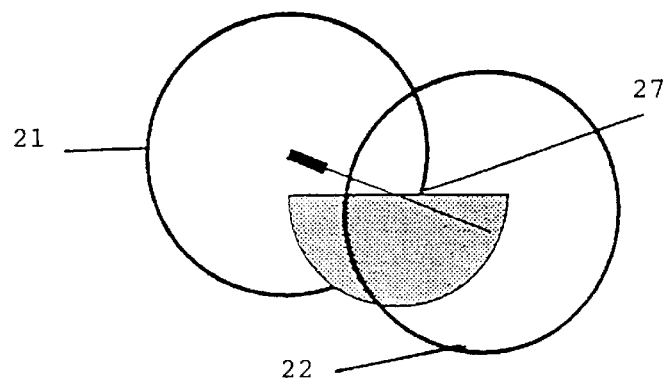

FIGS. 11 and 12 depict two other embodiments very similar to the previous ones in the case in which a movable reference 26 is used as the horizon line. This reference may be in the form of a strip, half-moon or colored lens. This reference moves either on a spindle 27 passing through the two lenses, as shown in FIG. 12, or by another means, such as a ball bearing (not shown). It should be pointed out that it is preferred to place in the gap between the lenses 21 and 22 a liquid 29 which acts as a damper.

Although preferred embodiments of the invention have been described, it should be well understood that many alternative embodiments remain possible within the scope of this invention, as defined by the appended claims.

I claim:

1. Spectacles frame which may or may not be provided with a lens, including a movable reference having the function of representing an artificial horizon, said movable reference being a solid member and being maintained in a permanent horizontal position by gravity regardless of the movements of the frame or of the head of the person wearing this frame.

2. Spectacles frame according to claim 1, characterized in that the artificial horizon (3) is physically defined by two differently colored or contrastingly shaded lens sectors (45).

3. Spectacles frame according to claim 1 characterized in that the artificial horizon (3) consists of a region, of greater or lesser width, which differentiates the adjacent regions (4, 4') by its shade, its color or its brightness in the lens.

4. Spectacles frame according to claim 1, characterized in that the lens comprising the artificial horizon (3) performs a rotational movement with respect to the frame under the effect of a peripheral bearing (12).

5. Spectacles frame according to claim 1, characterized in that the artificial horizon is formed by a strip (13) which is external to the lens and is constantly maintained in a permanent horizontal position.

6. Spectacles frame according to claim 1, characterized in that it comprises delaying or damping means including pistons.

7. Spectacles frame according to claim 1, characterized in that the movable reference (27) may be a strip, a half-moon, lens sectors or any other element having the function of representing an artificial horizon, this reference moving either on a spindle (28) or on a bearing (12).

* * * * *